(12) United States Patent
Viswanathan et al.

(10) Patent No.: US 9,141,914 B2
(45) Date of Patent: Sep. 22, 2015

(54) SYSTEM AND METHOD FOR RANKING ANOMALIES

(75) Inventors: Krishnamurthy Viswanathan, Mountain View, CA (US); Choudur Lakshminarayan, Austin, TX (US); Wade J. Satterfield, Fort Collins, CO (US); Vanish Talwar, Campbell, CA (US); Chengwei Wang, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 13/286,150

(22) Filed: Oct. 31, 2011

(65) Prior Publication Data

US 2013/0110761 A1 May 2, 2013

(51) Int. Cl.
*G06N 99/00* (2010.01)
(52) U.S. Cl.
CPC .................... *G06N 99/005* (2013.01)
(58) Field of Classification Search
CPC .................................................. G06N 99/005
USPC ............................................................ 706/12
See application file for complete search history.

(56) References Cited

U.S. PATENT DOCUMENTS

| 7,533,070 | B2 | 5/2009 | Guralnik et al. |
| 7,870,440 | B2 | 1/2011 | Vacar et al. |
| 2006/0184264 | A1* | 8/2006 | Willis et al. ................... 700/108 |
| 2009/0030753 | A1 | 1/2009 | Senturk-Doganaksoy et al. |
| 2010/0071061 | A1 | 3/2010 | Crovella et al. |

FOREIGN PATENT DOCUMENTS

WO WO-2011023924 3/2011

OTHER PUBLICATIONS

Chandola, V. et al., "Anomaly Detection: A Survey", ACM Computing Surveys, vol. 41, No. 3, Article 15, Jul. 2009, pp. 1-58.*
Sotiris, V. et al., "Anomaly Detection Through a Bayesian Support Vector Machine", Reliability, IEEE Trans. on, Jun. 2010, pp. 277-286.*
Rebbapragada, Umaa, et al. "Finding anomalous periodic time series", Mach. learning, vol. 74, No. 3, 2009, pp. 281-313.*
A. Patcha and JM Park, "An overview of anomaly detection techniques: Existing solutions and latest technological trends", Computer Networks vol. 51, No. 12, 2007, pp. 3448-3470.*
S. Rajasegarar et al., "Anomaly detection in wireless sensor networks", IEEE Wireless Communications, Aug. 2008, pp. 34-40.*
M. Markou and S. Singh, "Novelty detection: a review—part 1: statistical approaches", Signal Processing, vol. 83, pp. 2481-2497, 2003.*
D. Kifer et al., "Detecting Changes in Data Streams", Proc. 30th VLDB Conf., Toronto, Can. 2004, pp. 180-191.*
Johnston, Dennis, et al, "Using a Probability Approach to Rank In-Line Inspection Anomalies for Excavation and for Setting Reinspection Intervals", Apr. 18-20, 2000 13 pages.

* cited by examiner

*Primary Examiner* — Kakali Chaki
*Assistant Examiner* — Vincent Gonzales
(74) *Attorney, Agent, or Firm* — Van Cott, Bagley, Cornwall & McCarthy

(57) ABSTRACT

Probable anomalies associated with at least one data metric may be detected across a series of windows of time series data by comparison of data to a threshold. An estimated probability of anomalies for each of the windows of time series data may be determined based on the detected probable anomalies and the threshold. The windows of time series data may be ranked based on the estimated probabilities. Probable anomalies associated with highest ranked windows of time series data may be output to a user.

20 Claims, 4 Drawing Sheets

SYSTEM AND METHOD FOR RANKING ANOMALIES

BACKGROUND

Networked computer systems (e.g., data centers) are growing in size and complexity due to increased demand for cloud computing, on-line services, and other services. Networked computer systems and data centers may include multiple interconnected servers and associated hardware, systems and applications. In order to ensure proper function of networked computer systems (e.g., servers, data center components, and other systems) the hardware, systems, and applications in a networked computer system may be monitored to identify anomalous behavior (e.g., anomalies). Anomalies may, for example, include performance issues, failures, misconfigurations, and other anomalous server or data center behaviors. Data center anomalies may result in service level agreement (SLA) violations, downtimes, and other inefficiencies, which may affect the function of a data center. Anomaly detection methods and systems may identify and output anomalies or alerts to a data center operator or another system. The anomalies or alerts may, for example, include true positives and false alarms.

As the number of servers and complexity of data centers increases, the amount of anomalies or alerts output to a data center operator or system may increase. For a data center operator or a maintenance system to effectively maintain a networked computer system, anomalies may be categorized by severity, criticality, or other parameters. A real-time and high data frequency anomaly ranking system or method may, therefore, be needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
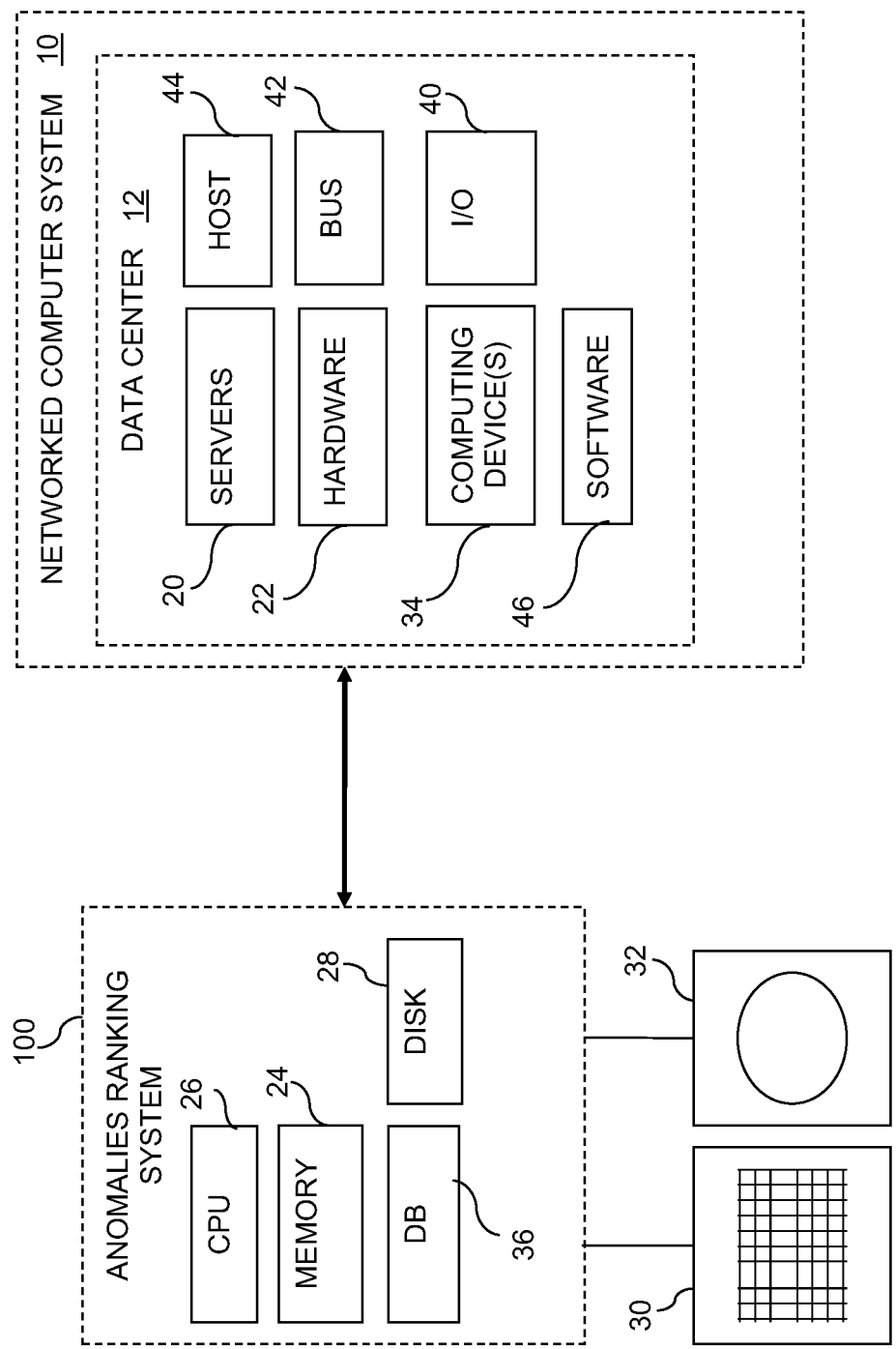
FIG. 1 is a schematic diagram of a anomaly ranking system according to examples of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood that the present invention may be practiced without these specific details. In other instances, certain methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission, or display devices.

Anomaly ranking methods and systems may be used to determine whether a system (e.g., a networked computer system, a data center, components of a data center, a set of servers, computing devices, or other systems) is functioning properly and to prioritize detected system problems. Many well-known methods are used to detect anomalies (e.g., outlier data) in time series data which may indicate anomalous networked computer system behavior.

Time series data may be monitored in a server, multiple servers, a data center, or other systems. Metrics (e.g., CPU idle time, input/output device rates) may be monitored for time series data to detect anomalies in the data, which may, for example, indicate anomalous system behavior (e.g., server malfunctions and errors). Anomalies may, for example, be determined using threshold based methods or approaches. Alerts based on detected anomalies may be output to a user (e.g., data center or server operator). In a system with a large number of servers and/or other devices, multiple metrics may be concurrently monitored by multiple anomaly detection systems. As a result, a large number of anomalies may be detected, and the anomalies detected may include true positives and false alarms. In order for a user to efficiently identify critical anomalous system behavior, the anomalies may be ranked and/or prioritized. Data, time series data, or a stream of data (organized or ordered in time) may be divided into a series of windows, the windows similarly organized or ordered in time. Each window may include many data observations points, and/or samples. Anomalies across multiple metrics may, for example, be ranked by detecting anomalies in concurrent or series of windows of time-series data, approximating the probability of each window (e.g., the probability of observed data or samples in window exceeding or violating a threshold), and ranking the windows according to their probability (or ranking according to multiple probabilities assigned to each window). Anomalies associated with the windows may be ranked based on estimated probabilities of the windows.

Each concurrent window of time series data may be measured by a separate anomaly detection system and each anomaly detection system may monitor time series data associated with a separate metric. The probability of each window of time series data may be estimated using Gaussian approximation, Bernoulli approximation, and/or other approaches. An estimated probability of each window of time series data may, for example, be an estimate of the aggregate or overall probabilities of observations or metric values in a window of time series data. An estimated probability of a window may represent probabilities of all observations in the window based on a predetermined or desired false positive rate.

Using a Gaussian approximation approach, each anomaly detection system (e.g., a local anomaly detector) may determine a probability of a window of time-series data or observed data based on or assuming a Gaussian probability distribution function. The probability of a window of time-series data may, for example, be determined based on Z-scores for data points (e.g., sample data points, samples, etc.) or an average of data points over window of time-series data. A Z-score or standard normal score may be a quantity or value which indicates how many standard deviations an observation or data point is above or below a mean (e.g., an average). Z-scores may, for example, be calculated for a sample using data points (e.g., observations) or average of data points over a window of time-series data based on a sample mean or possibly other data. Z-scores may, for example, be calculated using at least one sample mean, $\mu$, one sample standard deviation, $\sigma$, and/or other parameters. The probability of a window and associated anomalies may be output to a central node from each anomaly detection system. The central node may rank the windows output from each anomaly detection system based on their estimated probabilities (ranking may be according to multiple probabilities assigned to each window). The least probable windows (e.g., window associated with the lowest probability of an anomaly) and associated anomalies may receive the highest ranking. Other partitioning of processing tasks may be used, in that probabilities need not be created by anomaly detection systems and sent to a central node.

Using Bernoulli approximation, each anomaly detection system (e.g., a local anomaly detector) may measure time-series data related to a metric over a window of time and may output a number of samples or data points in the window of time series data which exceed a threshold. A central node may receive the number of samples in a window of time which exceed or have exceeded a threshold from each anomaly detection system and may calculate an estimated probability (e.g. a probability of anomalies occurring for data in the window) for each window based on the number of threshold exceeding samples and other parameters (e.g., a Bernoulli random variable), which may be obtained from a pre-specified or design false positive rate or other information. The central node may rank the concurrent windows based on the estimated probabilities. The least probable windows (e.g. windows with least probability of anomalies for data or observations within the windows) and associated anomalies may receive the highest ranking. One or more estimated probabilities may be calculated for each window. A ranked list of anomalies may be output to a user.

Anomaly ranking methods and systems may be advantageous in reducing the number of false positives in the anomaly data output to a user. Anomaly ranking systems may be useful in presenting a user with the most critical anomaly data or window of time series data. Anomaly ranking methods may be "lightweight" and may process each time series individually. Anomaly ranking methods may allow many different types of metrics to be measured using different methods and systems and to be compared to determine most critical anomalies across the varied metrics. Anomaly ranking methods and systems may improve system performance and availability by outputting data to a user, which may allow the user to quickly detect problems, diagnose problems, and to determine potential remedies to anomalous system behavior in a networked computer system and/or data center.

FIG. 1 is a schematic diagram of an anomaly ranking system according to examples of the present invention. Anomaly ranking system 100 (e.g., outlier ranking system, data center anomaly ranking system) may rank anomalies in time-series data collected or measured from a variety of sources. Time-series data may, for example, be measured within or output from a networked computer system 10 or other type of system. A networked computer system 10 may, for example, be or may include a data center 12 or other system(s). Anomalies ranking system 100 may or may not be a component of a networked computer system 10, a data center 12, virtual data center, server 20, computing device 34, network of servers 20, or other device(s) or system(s).

A networked computer system 10 or data center 12 may include a wide variety of computing devices such as servers 20 (e.g., blade servers), host server(s) 44, hardware 22, server computing devices 34 (e.g., computers, desktop computers, mobile devices, and other computing devices), input and output (I/O) devices 40, data bus(es) 42, data storage devices, telecommunications devices, networking devices, appliances (e.g., devices dedicated to providing a service), and other devices and systems.

Anomaly ranking system 100 may, for example, include processor(s) or controller(s) 26 (e.g., central processing unit(s)), memory 24, long term storage 28, database(s), input device(s) or area(s) 30, and output device(s) or area(s) 32. Input device(s) or area(s) 30 and output device(s) or area(s) 32 may be combined into, for example, a touch screen display and input which may be part of system 100.

Memory 24 or databases 36 may include, for example, anomaly detection threshold(s), false positive rates, anomaly data, metrics, window of time series data, and/or other information. Databases 36 may be stored all or partly in one or both of memory 24, long term storage 28, or another device.

Processor or controller 26 may be, for example, a central processing unit (CPU), a chip, or any suitable computing or computational device. Processor or controller 26 may include multiple processors, and may include general-purpose processors and/or dedicated processors such as graphics processing chips. Processor 26 may execute code or instructions, for example, stored in memory 24 or long-term storage 28, to carry out examples of the present invention.

Memory 24 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a memristor, a cache memory, a buffer, a short term memory unit, a long term memory unit, or other suitable memory units or storage units. Memory 24 may be or may include multiple memory units.

Long term storage 28 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 2:
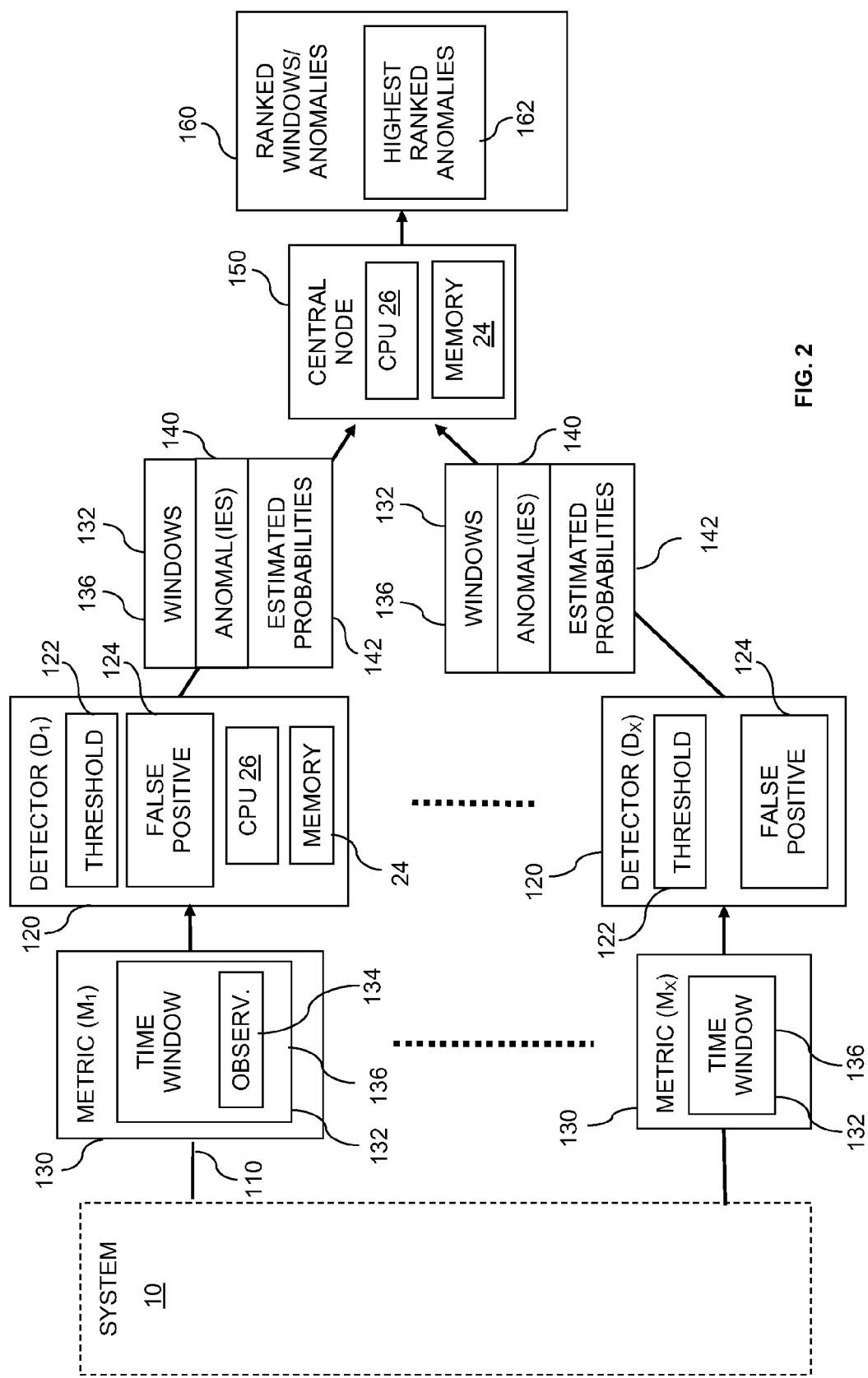
FIG. 2 is a flowchart depicting the operation of an anomaly ranking system according to examples of the present invention.

FIG. 2 is a flowchart depicting the operation of an anomaly ranking system according to examples of the present invention Time-series data 110 (e.g., time-series information, a data stream, or other data or information) may be measured or monitored by an anomaly detection system 120 (e.g., a local anomaly detection system) or other system or device. Anomaly detection system or module 120 may, for example, include processor 26 and memory 24, and portions of or all of methods described herein may be performed using processor 26 and memory 24 in anomaly detection system 120. Time series data 110 may, for example, be associated with, or be a measure of the operation of, a data center 12 (e.g., data center 12 components, servers 20, computing devices 34, and other systems). Time-series data 110 may, for example, be a stream or collection of data or information related to a metric 130. At least one metric 130 (e.g., data metric) associated with time-series data 110 may be monitored by a local anomaly detection system 120 to detect, flag, or identify anomalies or outliers 140 in time-series data 110. Time-series data 110 may be monitored by sampling data to generate time series data or metric observations, samples, or data points 134. Anomalies or outliers 140 in time series data 110 may be observations (e.g., point observations), samples (e.g., series of observations) and/or data points 134, or functions of observations (e.g., statistics) that violate or exceed a threshold 122 (e.g., a value of metric 130).

Data metrics 130 may, for example, include CPU 26 metrics (e.g., percentage of CPU idle time and other metrics), I/O 40 metrics (e.g., I/O transfers per second, blocks read per second, blocks write per second and other metrics), traffic or server 20 traffic metrics (e.g., packets received per second, packets transmitted per second, bytes received per second, bytes transmitted per second), and/or other metrics 130. Metrics 130 may, for example, be defined by or associated with a variety of parameters.

Anomalies 140 may, for example, arise in a variety of ways and may indicate or be symptoms of many different types of anomalous system 10 operation or behavior. Detecting anomalies 140 may, therefore, be useful in identifying anomalous system behavior in data center 12 components (e.g., servers 20 or other devices) or other devices. Anomalous system behavior may, for example, include performance issues, failures, misconfigurations, and other unintended system (e.g., server 20 or other device) or component behaviors. Anomalous system behavior may, for example, include server 20 malfunctions (e.g., server inactive or down, server reboot needed, server health check needed), abnormal network behavior, abnormal I/O device 40 utilization (e.g., abnormal disk I/O access, failing disk array controller(s), host bus adapter (HBA) card failure), abnormal computing device 34 behavior, abnormal application or software 46 behavior (e.g., busy loop process saturating CPU utilization), CPU interference, interference due to heavy batch jobs, and other anomalies.

Anomalies 140 in time series data 110 may be detected using threshold-based methods or approaches. A wide variety of threshold based anomaly detection methods and approaches may be used including parametric, non-parametric, and other types of methods. Anomaly detection (e.g., performed by local anomaly detection system 120) may analyze time series data 110 (e.g., associated with a metric 130) and may determine anomalies 140 using thresholds 122. Thresholds 122 may, for example, be a single value (e.g., a metric value), multiple values (e.g., defining upper and lower bounds or boundaries), a range of values, or other set of values. Thresholds 122 may, for example, be based on a desired false positive rate 124 (e.g., derived implicitly or explicitly from a desired false positive rate). A false positive rate 124 may, for example, be the probability that a statistic or observation 134 (e.g., an observed metric value 134) exceeds a threshold when there is no anomaly 140. False positive rates 124 may, for example, be derived from underlying data models.

Thresholds 122 may, in one example, be determined using parametric approaches based on the probability structure or distribution of time series data 110. In one example, a Gaussian probability distribution or other approach may be used. If, for example, a desired false positive rate 124 is less than one percent (1%) and the distribution of time series data 110 is assumed to be Gaussian, a threshold 122 may be set or defined as the sum of the mean ($\mu$) of time series data 110 and three times the standard deviation ($\sigma$). Other parametric approaches may, for example, include but are not limited to R-chart based approaches, multiple adaptive statistical filtering (MASF), supervised learning, unsupervised learning, and other methods and approaches.

Thresholds 122 may, in one example, be determined using a non-parametric approach (e.g., assuming no underlying stochastic structure and/or ad-hoc approach). In one example, a Tukey method may be used to determine thresholds 122. Time series data 110 may, for example, be divided into quartiles and thresholds 122 may be determined based on the quartiles. Quartiles may be determined or chosen based on desired false positive rates. Other non-parametric approaches may include but are not limited to mutual information based, relative entropy based, and other methods and approaches.

Multiple metrics 130 may, for example, be monitored across multiple devices (e.g., a server 20, multiple servers 20, hardware 22, components of system 10, components of data center 12, or other devices). Metrics 130 may, for example, be monitored in time series data 110 associated with multiple devices to detect anomalies 140. Time series data 110 associated with metrics 130 (e.g., k metrics $M_1, M_2, \ldots, M_k$) may, for example, be measured or monitored by multiple local anomaly detection systems 120 (e.g., k local anomaly detection systems $D_1, D_2, \ldots, D_k$). Each of multiple time series data 110 (e.g., associated with a metric 130) may, for example, be sampled at the same rate or may be sampled at different rates to generate observed or sample metric values 134. Observed or sample value(s) 134 of a metric at given times (e.g., $M_k(t)$) or over windows of time series data 132 (e.g., windows of metrics) may, for example, be input to or monitored by local anomaly detection system 120 (e.g., $D_k$). Each observed value of metric 134 (e.g., $M_k(t)$) may, for example, be labeled or flagged as an anomaly 140 or not an anomaly (e.g., anomaly detection may be binary). Anomalies 140 and associated information or data may, for example, be output to a central node 150 (e.g., ranking module) or other system or device.

Windows of time series data 132 may, for example, include at least one sample metric value or observation 134 observed over a window of time W (e.g., from t−W+1, t−W+2, . . . , t). Windows of time series data 132 may, for example, be time-series data 110 or multiple data observations 134 measured or monitored over a period of time (e.g., a window of time, W, or other period of time). Windows of time series data 132 (e.g., $M_k(t-dW+1), M_k(t-W+2), \ldots, M_k(t)$) may, for example, be monitored to detect anomalies 140 (e.g., based on threshold 122). Average metric value(s) over the window of time series data 132 may, for example, be calculated and average metric values may be compared to thresholds 122 by local anomaly detection system 120. Windows of time series data 132 associated with average metric value(s) that exceed or otherwise violate threshold(s) 122 may be flagged as or deemed to be anomalies 140 (e.g., anomalous windows). An anomalous window may, for example, be a window which includes a sample or observed metric value 134 which exceeds or violates threshold 122, or may be a window which includes sample or observed metric values 134 whose average exceeds or violates threshold 122.

Anomalies 140 (e.g., windows 132 including anomalies) may, for example, be output to a central node 150 (e.g., a ranking module) or other system or device. An anomaly 140 may, for example, be an observed metric value 134 which exceeds or violates threshold 122, an anomalous window, a reference or link to an anomalous window, a timestamp of an observed metric value 134 which exceeds or violates threshold 122, or another value.

Multiple metrics 130 (e.g., $M_1, M_2, \ldots, M_k$) may, for example, be measured over concurrent or approximately concurrent (e.g., with 100 ms or another value) windows of time.

For example, a first metric 130 (e.g., $M_1$) over a window of time series data 132 (e.g., $M_1(t-W+1)$, $M_1(t-W+2)$, ..., $M_1(t)$) may be monitored or measured by, for example, a first local anomaly detection system 120. Over the same window of time or a temporally similar (e.g., approximately concurrent) window of time (e.g., within 100 ms or another value), k other metric(s) 130 (e.g., at least one metric 130) may be monitored over window(s) of time series data 132 (e.g., $M_2(t-W+1)$, $M_2(t-W+2)$, ..., $M_2(t)$) by, for example, k other anomaly detection systems 120. Each of the k local anomaly detection systems 120 may output window of time series data 132, anomaly data 140 (e.g., data indicating whether window of time series 132 may be or include an anomaly), and/or other data and information.

One or more estimated probabilities 142 of anomalies for each of multiple windows of time series data 132 may, for example, be calculated or determined based on detected probable anomalies 140, thresholds 122, and/or other parameters. Estimated probabilities of anomalies of each of multiple windows of time series data 132 may, for example, be determined using a Gaussian approach, Bernoulli approach or other method or approach. Anomalies 140 (e.g., data observations 134 which violate threshold 122) may for example be associated with or included in windows of time series data 132. A window of time series data 132 may be associated with an estimated probability of time series data 132. An anomaly or anomalies 140 may, for example, be ranked based on the estimated probability of time series data 132 associated with the anomaly or anomalies 140.

Estimated probabilities of anomalies 142 for each of the windows of time series data 132 may be determined based on the detected probable anomalies 140 using Gaussian approximation based on Z-scores, which may be determined using a sample mean ($\mu$) and a standard deviation ($\sigma$). In one example, multiple metrics 130 over windows of time series data 132 may be monitored for anomalies 140 using a Gaussian method. Time series data 132 may, for example, be assumed to be Gaussian. Each metric 130 may be monitored over a window of time series data 132 by comparing the window of time series data 132 to threshold(s) 122 based on the mean ($\mu$) and standard deviation ($\sigma$) of the underlying distribution (e.g., a distribution of time series data 110). A probability of each observation 134 (e.g., $M_k(t)$) in window of time series data 132 may, for example, be calculated. To calculate the probabilities of each observation 134, time series data 110 may, for example, be quantized into a set of buckets (e.g., $\{b_1, b_2, \ldots\}$). A bucket may, for example, be a range of metric 130 values (e.g., if metric 130 is I/O transfers per second (tps), a range may be a range of I/O tps). Each bucket (e.g., $\{b_1, b_2, \ldots\}$) may, for example, be of equal width or size in terms of a range of metric values (e.g., if metric 130 is I/O transfers per second (tps), each range may be 10 tps in width (e.g., 0-10 tps, 10 tps to 20 tps, etc.)) or may be different widths or sizes. Window of time series data 110 may, for example, be mapped or transferred to a set of buckets (e.g., $\{b_1, b_2, \ldots\}$) using a mapping function (e.g., Q). A probability, $\tilde{P}(b_i)$, of a data sample (e.g., sample metric value 134) falling into a bucket (e.g., $b_i$) may, for example, be determined. The probability that a random variable, X, (e.g., a random Gaussian variable) falls into a bucket, $b_i$, or $Q(X)=b_i$ may be given by $\tilde{P}(b_i)$. The probability, $\tilde{P}(b_i)$, of data sample 134 falling into a bucket may, for example, be calculated using a cumulative distribution function of the standard Gaussian distribution or other equation, function or approach. Z-scores, $Z_k(t)$, for each observation, $M_k(t)$, may, for example, be calculated based on a sample mean, $\mu_k$, and sample standard deviation, $\sigma_k$, of each metric 130, $M_k$, using an equation such as:

$$Z_k(t) = \frac{M_k(t) - \mu_k}{\sigma_k}$$

The Z-scores may, for example, be context dependant. For example, mean, $\mu_k$, and standard deviation, $\sigma_k$, values for a metric 130, $M_k$, may be dependent on time and may be calculated for days of the week, hour of the day, and other periods of time (e.g., using multivariate adaptive statistical filtering (MASF) or other approaches).

In one example, Z-scores may be calculated over window of time series data 132. For example, window of time series data 132 (e.g., $M_k(t-W+1)$, $M_k(t-W+2)$, ..., $M_k(t)$) may be defined by a predefined length of time, W. Z-scores over window of time series data 132 (e.g., $Z_k(t-W+1)$, $Z_k(t-W+2)$, ..., $Z_k(t)$) may, for example, be calculated based on a sample mean, $\mu_k$, and sample standard deviation, $\sigma_k$, of metric 130, $M_k$ (e.g., time series data 110 associated with metric 130). Z-scores over window of time series data 132 (e.g., $Z_k(t-W+1)$, $Z_k(t-W+2)$, ..., $Z_k(t)$) may, for example, be calculated by local anomaly detection system 120 or another system or module.

An estimated probability of anomalies for a window of time series data 142 (e.g., probability of an observed window, probability associated with an observed window) may, for example, be determined or calculated. In one example, an estimated probability of anomalies 142 for each of the most recent windows of time series data 136 for each of a plurality of monitored time series 110 may be determined. A most recent window of time series data 136 may, for example, be a most temporally recent window of time series data 132 (e.g., most recently measured or sampled window), multiple temporally recent windows 132 or other windows 132. Based on the assumption that observed metric values 134 (e.g., $M_k(t)$) are statistically independent, probability of a window of time series data 142 may, for example, be approximated based on Z-scores over window of time series data 132 using an equation such as:

$$P_k(Z_k(t-W+1), Z_k(t-W+2), K, Z_k(t)) \approx \Pi_{j=t-W+1}^{t} \tilde{P}(Q(Z_k(j)))$$

If the number of buckets (e.g., $\{b_1, b_2, \ldots\}$) is above a predefined number or the number of buckets is very large, estimated probability of a window of time series data 142 (e.g., $P_k(Z_k(t-W+1), Z_k(t-W+2), K, Z_k(t))$) may be calculated using an equation such as:

$$P_k(Z_k(t-W+1), Z_k(t-W+2), K, Z_k(t)) \approx c \cdot e^{\left(-\frac{1}{2}\sum_{j=t-W+1}^{t} Z_j^2\right)}$$

The constant c may, for example, be a predetermined constant and may be ignored or disregarded in ranking windows of time series data 132 and/or anomalies 140. As the number of buckets (e.g., $\{b_1, b_2, \ldots\}$) increases the probability distribution function may more accurately estimate or approximate probability of data sample lying in bucket $b_i$, $\tilde{P}(b_i)$. Estimated probability of a window of time series data 142 may, for example, be determined or calculated using anomaly detection system 120. Multiple anomaly detection systems 120 (e.g., local anomaly detection systems) may, for example, calculate estimated probability of window time series data 142 (e.g., $P_k(Z_k(t-W+1), Z_k(t-W+2), K, Z_k(t))$) for multiple metrics 130 (e.g., $M_1, M_2, \ldots, M_k$). Anomalies 140 and associated windows of time series data 132 and estimated probability of window time series data 142 (e.g., $P_k(Z_k(t-W+1), Z_k(t-W+2), K, Z_k(t))$) may, for example, be output from anomaly detection systems 120 to a central node 150 or other system or module.

Central node 150 may, for example, receive anomalies 140 and associated windows of time series data 132 and estimated probability of window time series data 142 (e.g., $P_k(Z_k(t-W+1), Z_k(t-W+2), K, Z_k(t))$). (In other examples processing organization may be different, and may not rely on a central node or system receiving anomaly data.) Central node 150 may, for example, include processor 26 and memory 24, and portions of or all of methods described herein may be performed using processor 26 and memory 24 in central node 150. Central node 150 may, for example, receive anomalies 140 and associated estimated probability of window time series data 142 (e.g., $P_k(Z_k(t-W+1), Z_k(t-W+2), K, Z_k(t))$) at a time (e.g., time t) associated with the end of window of time series data 132 (e.g., from t−W+1 to t). Anomalies 140 and/or associated windows of time series data 132 may, for example, be ranked based on associated estimated probability of window time series data 142 (e.g., $P_k(Z_k(t-W+1), Z_k(t-W+2), K, Z_k(t))$). In one example, anomalies 140 and/or associated windows of the time series data 132 may be ranked based on the estimated probabilities for each of the most recent windows 136. Anomalies 140 and/or associated windows of time series data 132 may, for example, be ranked in ascending order of estimated probability of window time series data 142 (e.g., $P_k(Z_k(t-W+1), Z_k(t-W+2), K, Z_k(t))$). For example, an anomaly 140 and/or associated window of time series data 132 associated with a least estimated probability of window time series data 142 (e.g., $P_k(Z_k(t-W+1), Z_k(t-W+2), K, Z_k(t))$) may be a highest ranked or most critical window time series data. An anomaly 140 and/or associated window of time series data 132 associated with least estimated probability of window time series data 142 (e.g., $P_k(Z_k(t-W+1), Z_k(t-W+2), K, Z_k(t))$) may be associated with a highest ranked or most critical anomaly 162. A highest ranked or most critical anomaly 162 and/or window of time series data 132 may, for example, be an anomaly 140 and/or window of time series data 132 associated with a least likelihood of occurrence. An anomaly 140 associated with a lower likelihood of occurrence may be less likely to be a false positive than anomaly associated with higher likelihood of occurrence. Windows of time series data 132 and/or metrics 130 associated with higher estimated probability of window time series data 142 may, for example, include more anomaly false positive(s), anomaly false alarm(s), and/or noise. Time series data 110 including more anomaly false positive(s), anomaly false alarm(s), and/or noise may be less likely to be associated with or representative of anomalous system 10 behavior (e.g., anomalous data center 12 component behavior). Windows 132 may, in some examples, be ranked according to multiple probabilities assigned to each window.

Ranked anomalies and/or windows 160 (e.g., probable anomalies associated with highest ranked windows of time series data and/or windows associated with lowest estimated probabilities) and/or highest ranked anomalies 162 may, for example, be output to a user (e.g., networked computer system 10, data center 12, or server 20 operator) and/or other systems, devices, or modules. Ranked anomalies and/or windows 160 or highest ranked anomalies and or windows 162 may, for example, be output to a user using output device 32 or similar device. Probable anomalies associated with highest ranked windows of time series data 160 may, for example, be the probable anomalies associated with the three, five, ten, or any number of highest ranked windows of time series data.

In some examples, time series data 110 and/or windows of time series data 132 associated with metrics 130 may, for example, not be Gaussian and estimated probabilities of window time series data 142 may, for example, not be calculated based on Z-scores (e.g., based on mean, $\mu_k$, and standard deviation, $\sigma_k$, values for a metric 130). Estimated probabilities of window time series data 142 may, for example, be estimated or approximated based on other parametric, non-parametric, or other distributions (e.g., Weibull distribution, other probability distributions, or other distributions). Time series data 110 may, for example, be transformed or altered to be compatible with Gaussian probability approaches or other methods. Anomaly detection system 120 may, for example, output anomalies 140, estimated probabilities of window time series data 142, and other data or information related to the parametric, non-parametric, and/or other distribution to central node 150 or other system or module. Central node 150 or other system or module may, for example, based on estimated probabilities of window time series data 142 and other data or information related to the parametric, non-parametric, and/or other distribution rank anomalies 140 and/or associate windows of time series data 132. Central node 150 may similarly determine highest ranked or most critical anomalies 162 and/or associated windows of time series data 132. Anomalies 140 associated with highest ranked windows of time series data 132 and/or highest ranked anomalies 162 may, for example, be output to a user and/or other systems, devices, or modules.

Figure 3:
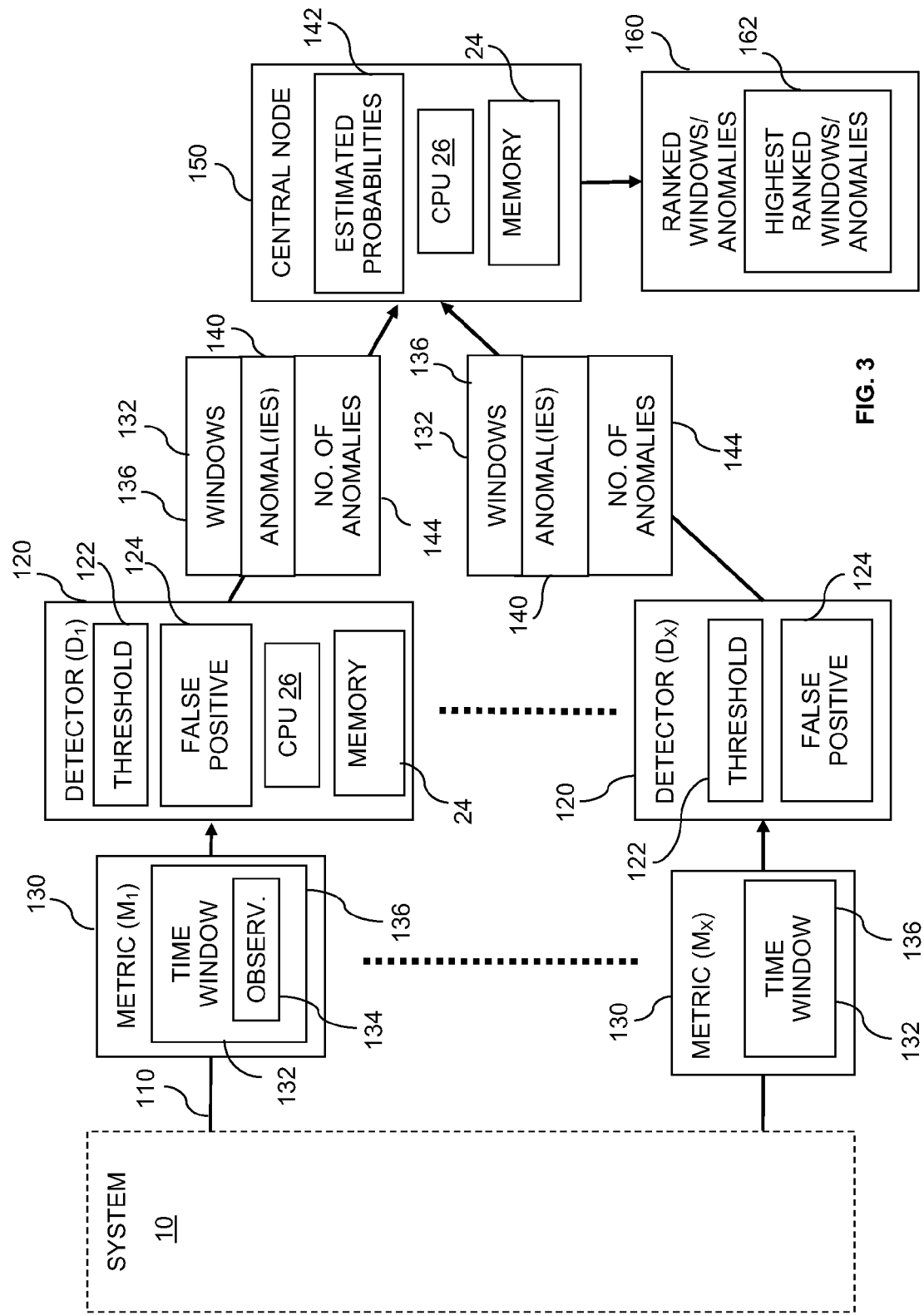
FIG. 3 is a flowchart depicting the operation of an anomaly ranking system according to examples of the present invention.

FIG. 3 is a flowchart depicting the operation of an anomaly ranking system according to examples of the present invention. Estimated probabilities of anomalies associated with each of multiple windows of time series data 132 may, for example, be calculated or determined using Bernoulli approximation or other approaches or methods. Bernoulli approximation may, for example, be used to reduce the amount of computation or communication performed by local anomaly detection systems 120, if local anomaly detection systems 120 do not include probability computation capabilities, or for other reasons.

Using Bernoulli approximation or another approach, each local anomaly detection system 120 (e.g., local detector $D_k$) may, for example, monitor or measure windows of time series data 110 (e.g., $M_k(t-W+1), M_k(t-W+2), \ldots, M_k(t)$). Each local anomaly detection system 120 may, for example, monitor time series data 110 (e.g., associated with a metric). Sample metric values 134 (e.g., $M_k(t)$) and/or sample metric values 134 in window of time series data 132 (e.g., $M_k(t-W+1), M_k(t-W+2), \ldots, M_k(t)$) may be compared to a threshold 122 (e.g., $T_k$). Based on the comparison of sample metric values 134 in window of time series data 110 (e.g., $M_k(t-W+1), M_k(t-W+2), \ldots, M_k(t)$) to threshold 122 (e.g., $T_k$), a number of observations, samples, or anomalies 144 (e.g., $W_k(t-W+1:t)$) may be determined or calculated. Number of samples 144 (e.g., $W_k(t-W+1:t)$) may, for example, be output to central node 150 or other system or module.

Number of samples 144 may, for example, be received by central node 150. Estimated probability of window time series data 142, $P_k$, may, for example, be determined or calculated by central node 150 or other system or module based number of samples 144 (e.g., $W_k(t-W+1:t)$), length or duration of time window 132 (e.g., W), estimated probability parameter, $p_k$, and/or other parameters on using an equation such as:

$$P_k \approx p_k^{W_k(t-W+1:t)}(1-p_k)^{W-W_k(t-W+1:t)}$$

In one example, an estimated probability of anomalies 142 for each of the most recent windows of time series data 136 of each of a plurality of monitored time series 110 may be determined based number of samples 144 (e.g., $W_k(t-W+1:t)$), length or duration of time window 132 (e.g., W), estimated probability parameter, $p_k$, and/or other parameters.

Estimated probability parameter, $p_k$, may, for example, be an estimate of the probability that a sample metric value 134, $M_k(t)$, violates or exceeds threshold 122, $T_k$. Estimated probability parameter, $p_k$, may, for example, be a design false positive rate 124 (e.g., false positive rate), may be based on or derived from a design false positive rate 124, or may be another parameter. Estimated probability or window time series data 142 (e.g., $P_k$) may, for example, be estimated or approximated based on estimated probability, $p_k$, under a model where the event that each measurement violates a threshold is modeled as a Bernoulli random variable.

Windows of time series data 132 (e.g., $M_k(t-W+1)$, $M_k(t-W+2)$, . . . , $M_k(t)$) and associated anomalies 140 may, for example, be ranked based on estimated probability of window time series 142, $P_k$, values. In one example, anomalies 140 and/or windows of the time series data 132 may be ranked based on the estimated probabilities for each of the most recent windows 136. Anomalies 140 and/or associated windows of time series data 132 may, for example, be ranked in ascending order of estimated probability of window time series data 142, $P_k$. For example, an anomaly 140 associated with least estimated probability of window time series data 142, $P_k$, may be a highest ranked or most critical anomaly 162. A highest ranked or most critical anomaly 162 may, for example, be an anomaly 140 associated with a least likelihood of occurrence.

In one example, if thresholds 122, $T_k$, are selected such that estimated probability parameter, $p_k$, is equal for each of the windows of time series data 132, windows of time series data 132 may, for example, be ranked based on number of metric values 130, which exceed or violate threshold 122, $T_k$.

Ranked anomalies 160 and/or highest ranked anomalies 162 may, for example, be output from central node 150 or other system to a user (e.g., networked computer system 10, data center 12, or server 20 operator) and/or other systems, devices, or modules. Ranked anomalies 160 and/or highest ranked anomalies 162 may, for example, be output to a user using output device 32 or similar device. A user may, for example, be a data center 12 technician or operator and may fix or resolve performance issues, failures, misconfigurations, and other anomalous server or data center behaviors using ranked anomalies 160. Ranked anomalies may allow a user to quickly and efficiently identify and resolve the most critical performance issues, failures, misconfigurations, and other anomalous server or data center behaviors.

Using Bernoulli approximation or another approach may, for example, reduce local anomaly detection system 120 computation. Local anomaly detection systems 120 may, for example, determine or calculate a number of anomalies or samples 144, $W_k(t-W+1:t)$ and output a number of samples 144 to central node 150. Using Bernoulli approximation or another approach may allow each local anomaly detection system 120 to use different anomaly detection methods or approaches (e.g., Tukey method, Gaussian based methods, parametric, non-parametric, and other types of methods). Different anomaly detection methods may, for example, be used to determine a number of anomalies or samples 144 which exceed threshold 122, and number of samples 144 may be output to central node 150, which may determine estimated probability of window time series data 142, $P_k$, based on number of samples 144.

Figure 4:
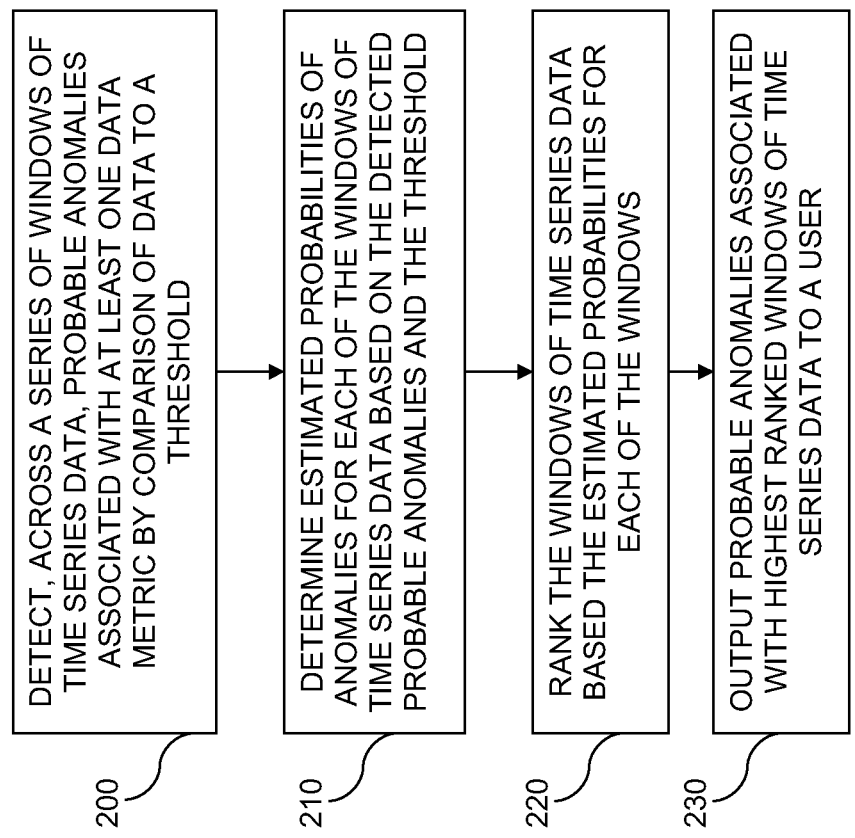
FIG. 4 is a flowchart of a method according to examples of the present invention.

FIG. 4 is a flowchart of a process according to examples of the present invention. In operation 200, probable anomalies (e.g., anomalies 140 of FIG. 2) associated with at least one data metric (e.g., metric 130 of FIG. 2) may be detected across a series of windows of time series data (e.g., window of time series data 132 of FIG. 2) by comparison of data to a threshold (e.g., threshold 122 of FIG. 2).

In operation 210, estimated probabilities of anomalies (e.g., estimated probability of a window of time series data 142 of FIG. 2) for each of the windows of time series data may be determined based on the detected probable anomalies and the threshold. In one example, the estimated probability of anomalies for each most recent window of time series data (e.g., most recent window of time series data 132 of FIG. 2) for each of a plurality of monitored time series (e.g., time series data 110 of FIG. 2) may be determined.

In operation 220, the windows of time series data may be ranked (e.g., by central node 150 or other module) based on the estimated probabilities for each of the windows. Ranking may be according to one or multiple probabilities assigned to each window. In one example, the windows of the time series data may be ranked based on the estimated probabilities for each of the most recent windows.

In operation 230, probable anomalies associated with highest ranked windows of time series data may be output to a user (e.g., using output device 32).

Other or different series of operations may be used.

Examples of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Examples of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different examples are disclosed herein. Features of certain examples may be combined with features of other examples; thus certain examples may be combinations of features of multiple examples. The foregoing description of the examples of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising, with a number of processors:
    detecting, across a plurality of windows of time series data, probable anomalies associated with at least one data metric by comparison of data samples within the windows of time series data to a threshold;
    determining an estimated probability of anomalies for each of a number of most recent windows of time series data for each of a plurality of monitored time series based on the detected probable anomalies and the threshold; and
    ranking the windows of time series data based on the estimated probabilities for each of the number of most recent windows of time series data.

2. The method of claim 1, wherein determining the estimated probability of anomalies for each of the number of most recent windows of time series data for each of the plurality of monitored time series based on the detected probable anomalies and the threshold comprises determining estimated probabilities using Gaussian approximation based on Z-scores, the Z-scores calculated using at least:
    one sample mean; and
    one sample standard deviation.

3. The method of claim 2, wherein the threshold comprises a threshold based on the mean and standard deviation of an underlying series data distribution of the data samples within the plurality of windows of time series data.

4. The method of claim 1, wherein:
    detecting, across the plurality of windows of time series data, probable anomalies associated with the at least one data metric by comparison of data samples within the plurality of windows of time series data to the threshold comprises detecting a number of data samples which exceed the threshold; and
    determining the estimated probability of anomalies for each of the number of most recent windows of time series data for each of a plurality of monitored time series based on the detected probable anomalies and the threshold comprises determining estimated probabilities using Bernoulli approximation based on the number of samples.

5. The method of claim 1, wherein ranking the windows of time series data-based the estimated probabilities for each of the number of most recent windows of time series data comprises ranking the windows of time series data from lowest estimated probability of anomaly to highest estimated probability of anomaly, wherein a window of time series data associated with the lowest estimated probability comprises a highest ranked window of time series data.

6. The method of claim 1, wherein:
    determining the estimated probability of the anomalies for each of the number of most recent windows of time series data for each of the plurality of monitored time series based on the detected probable anomalies and the threshold comprises:
        determining, using local anomaly detection systems, the estimated probabilities using Gaussian approximation based on Z-scores, at least one sample mean, and at least one sample standard deviation; and
        outputting the estimated probabilities to a central node, the central node being a computing device separate from a device that determines the at least one sample mean and the at least one sample standard deviation; and
    ranking the windows of time series data based on the estimated probabilities for each of the number of most recent windows of time series data comprises ranking, by the central node, the estimate probabilities output from the local anomaly detection systems.

7. The method of claim 1, wherein:
    detecting, across a plurality of windows of time series data, probable anomalies associated with at least one data metric by comparison of data samples within the plurality of windows of time series data to a threshold comprises:
        determining, using local anomaly detection systems, a number data samples which exceed the threshold; and
        outputting the number of data samples to a central node;
    determining the estimated probability of anomalies comprises determining, by the central node, the estimated probabilities using Bernoulli approximation based on the number of the data samples; and
    ranking the windows of time series data based the estimated probabilities for each of the number of most recent windows of time series data comprises ranking, by the central node, the estimated probabilities output from the local anomaly detection systems.

8. The method of claim 1, further comprising:
    outputting the ranked windows of time series data to the user comprising outputting the probable anomalies associated with highest ranked windows of time series data to a user.

9. The method of claim 1, wherein the plurality of windows of time series data comprises data associated with a data center.

10. A system comprising:
    a memory; and
    a processor to:
        detect, across a plurality of windows of time series data, probable anomalies associated with at least one data metric by comparison of data samples within the windows of time series data to a threshold, each of the windows of time series data comprising data samples measured over a period of time;
        determine an estimated probability of anomalies for each of the windows of time series data based on the detected probable anomalies and the threshold; and
        rank the windows of time series data based on the estimated probabilities,
    wherein the threshold is set based on a desired false positive rate.

11. The system of claim 10 wherein to determine an estimated probability of anomalies for each of the windows of time series data based on the detected probable anomalies and the threshold, the processor is to determine estimated probabilities using Gaussian approximation based on Z-scores, the Z-scores calculated using at least:
    one sample mean; and
    one sample standard deviation.

12. The system of claim 10, wherein:
    to detect, across the plurality of windows of time series data, probable anomalies associated with the at least one data metric by comparison of the data samples within the plurality of windows of time series data to the threshold, the processor is to detect a number data samples which exceed the threshold; and
    to determine an estimated probability of anomalies for each of the windows of time series data based on the detected probable anomalies and the threshold, the processor is to determine estimated probabilities using Bernoulli approximation based on the number of data samples.

13. The system of claim 10, wherein to rank the windows of time series data based on the estimated probabilities the processor is to rank the windows of time series data from lowest estimated probability of anomaly to highest estimated probability of anomaly, wherein a window of time series data associated with the lowest estimated probability comprises a highest ranked window of time series data.

14. The system of claim 10, wherein the processor:
determines the estimated probability of anomalies for each of a number of most recent windows of time series data for each of a plurality of monitored time series; and
ranks the windows of time series data based on the estimated probabilities for each of the number of most recent windows of time series data.

15. A computer program product for ranking anomalies, the computer program product comprising:
a non-transitory computer readable storage medium comprising computer usable program code embodied therewith, the computer usable program code comprising computer usable program code to, when executed by a processor:
detect, across a plurality of windows of time series data, probable anomalies associated with at least one data metric by comparison of data samples within the plurality of windows of time series data to a threshold, each of the windows of time series data to be measured by a separate anomaly detection system, and each anomaly detection system monitoring the data samples associated with a different metric;
determine an estimated probability of anomalies for each of the windows of time series data based on the detected probable anomalies and the threshold;
rank the windows of time series data based on the estimated probabilities.

16. The computer program product of claim 15, wherein the computer usable program code to, when executed by the processor, determine the estimated probability of anomalies for each of the windows of time series data based on the detected probable anomalies and the threshold comprises computer usable program code to, when executed by the processor, determine estimated probabilities using Gaussian approximation based on Z-scores, the Z-scores calculated using at least:
one sample mean; and
one sample standard deviation.

17. The computer program product of claim 16, wherein the threshold comprises a threshold based on the mean and standard deviation of an underlying data distribution.

18. The computer program product of claim 15, wherein:
the computer usable program code to, when executed by the processor, detect, across the plurality of windows of time series data, the probable anomalies associated with the at least one data metric by comparison of the data samples within the plurality of windows of time series data to a threshold comprises computer usable program code to, when executed by the processor, detect a number of the data samples which exceed the threshold; and
the computer usable program code to, when executed by the processor, determine the estimated probability of the anomalies for each of the windows of time series data based on the detected probable anomalies and the threshold comprises computer usable program code to, when executed by the processor, determine the estimated probabilities using Bernoulli approximation based on the number of samples.

19. The computer program product of claim 15, wherein the
computer usable program code to, when executed by the processor, determine the estimated probability of the anomalies for each of the windows of time series data based on the detected probable anomalies and the threshold comprises:
computer usable program code to, when executed by the processor, determine, using local anomaly detection systems, the estimated probabilities using Gaussian approximation based on Z-scores, at least one sample mean, and at least one sample standard deviation; and
computer usable program code to, when executed by the processor, output the estimated probabilities to a central node; and
computer usable program code to, when executed by the processor, rank the windows of time series data based on the estimated probabilities comprises computer usable program code to, when executed by the processor, rank, by the central node, the estimated probabilities output from the local anomaly detection systems.

20. The computer program product of claim 15, wherein:
the computer usable program code to, when executed by the processor, determine the estimated probability of anomalies for each of the windows of time series data based on the detected probable anomalies and the threshold comprises computer usable program code to, when executed by the processor, determine the estimated probability of anomalies for each of a number of most recent windows of time series data for each of a plurality of monitored time series; and
the computer usable program code to, when executed by the processor, rank the windows of time series data based on the estimated probabilities comprises computer usable program code to, when executed by the processor, rank the windows of time based on the estimated probabilities for each of the number of most recent windows of time series data.

* * * * *